United States Patent [19]

Fischer et al.

[11] Patent Number: 5,209,652
[45] Date of Patent: May 11, 1993

[54] COMPACT CRYOGENIC TURBOPUMP

[75] Inventors: Richard L. Fischer, Rolling Hills Estates; Terence P. Emerson, Hermosa Beach; Alston L. Gu, Rancho Palos Verdes, all of Calif.

[73] Assignee: Allied-Signal, Inc., Morris Township, Morris County, N.J.

[21] Appl. No.: 804,345

[22] Filed: Dec. 6, 1991

[51] Int. Cl.⁵ .............................................. F04B 17/00
[52] U.S. Cl. ................................... 417/409; 62/50.6; 384/103; 384/121; 415/112; 417/53; 417/901
[58] Field of Search .................. 415/110, 111, 112; 62/50.6; 417/405-409, 901, 53; 384/100, 103-107, 114, 121

[56] References Cited

U.S. PATENT DOCUMENTS

| | | |
|---|---|---|
| 2,013,499 | 8/1932 | Meckenstock . |
| 2,163,464 | 6/1939 | Llewllyn . |
| 2,694,981 | 11/1954 | Daugherty et al. . |
| 2,921,533 | 1/1960 | Williams . |
| 2,925,290 | 2/1960 | Greenwald . |
| 2,936,714 | 5/1960 | Balje . |
| 2,956,502 | 10/1960 | Glaser et al. . |
| 3,033,120 | 5/1962 | Williams . |
| 3,132,594 | 5/1964 | Shiley et al. ............ 417/901 |
| 3,250,221 | 5/1966 | Williams . |
| 3,358,608 | 12/1967 | Chabica . |
| 3,364,866 | 1/1968 | Sato . |
| 3,382,014 | 5/1968 | Marley . |
| 3,474,733 | 10/1969 | Saletzki et al. . |
| 3,563,618 | 2/1971 | Ivanov . |
| 3,728,857 | 4/1973 | Nichols . |
| 3,764,236 | 10/1973 | Carter . |
| 3,895,689 | 7/1975 | Swearingten . |
| 3,975,117 | 8/1976 | Carter . |
| 4,242,039 | 12/1980 | Villard et al. ............ 415/112 |
| 4,296,937 | 10/1981 | Handa . |
| 4,355,850 | 10/1982 | Okano . |
| 4,388,040 | 6/1983 | Sakamaki . |
| 4,624,583 | 11/1986 | Saville et al. . |
| 4,655,684 | 4/1987 | Haentjens . |
| 4,684,318 | 8/1987 | Mulders . |
| 4,792,278 | 12/1988 | Emerson . |
| 4,795,274 | 1/1989 | Gu . |
| 4,808,070 | 2/1989 | Fonda-Bonardi . |
| 4,818,123 | 4/1989 | Gu . |
| 4,871,267 | 10/1989 | Gu . |

FOREIGN PATENT DOCUMENTS 877139 10/1981 U.S.S.R. ............ 415/112

Primary Examiner—Harold J. Tudor
Attorney, Agent, or Firm—Robert A. Walsh

[57] ABSTRACT

A turbopump which operates at cryogenic temperatures to pump cryogenic liquid fuels to high pressure, and which includes a rotating group supported on process fluid foil journal bearings and a hydrostatic and hydrodynamic foil thrust bearing. A back-face surface of a pump rotor reacts thrust forces to the foil thrust bearing and receives counter acting hydrostatic fluid forces dynamically moderated to achieve an equilibrium axial position and force balance.

16 Claims, 3 Drawing Sheets

COMPACT CRYOGENIC TURBOPUMP

The emergence of cryogenic fuels such as liquid hydrogen and liquid oxygen as the leading candidates for use within orbital transfer vehicles and transatmospheric vehicles results in a need for reliable cryogenic fuel turbopumps. These turbopumps are placed intermediate the fuel tanks and the engine assembly in order to deliver cryogenic fuel to the engine at a desired high pressure. The turbopumps must operate at or near the cryogenic temperatures of the fuels while it is essential that the turbopumps be extremely reliable. Additionally, use on these types of vehicles inherently requires an efficient and compact configuration.

Generally, the cryogenic fuel turbopump will have a rotating assembly including a turbine and a pump mounted on a common shaft all contained within a housing assembly. Since the rotating group is the only moving element with the turbopump, mounting and support of the rotating assembly becomes the critical factor with respect to the reliability and life of the turbopump. Currently, cryogenic turbopumps use ball bearing type journal bearings to support the rotating assembly. However, ball bearings operating at cryogenic temperatures have short and unpredictable service lives. The premature failure of ball bearings in these turbopumps may be traced to one or more of the following factors. First, cryogenic temperatures preclude the use of conventional oil lubricating methods. Second, these turbopumps operate at high speeds for maximum efficiency, at these speeds the centrifugal forces on the balls become excessive and thereby limit bearing life. Third, to adapt ball bearings to high speed applications, the bearing diameter is reduced to achieve a lower DN (diameter times RPM) value, adversely resulting in the shaft bending critical speed approaching the maximum operating speed and making the rotating assembly sensitive to out of balance forces. Thus, ball bearing systems are not deemed practical for high reliability turbopumps that require long life.

As an alternative to ball bearings, the use of hydrostatic journal bearings and tilting pad journal bearings have been explored. In the case of hydrostatic bearings that utilize the high pressure available in the turbopump, rotor dynamic performance is critical. This requires careful design and consideration of the interaction of bearing pressure, stiffness, damping parameters, and rotor natural frequencies during transient speed operation. To accomplish a desirable balancing of the factors, the estimated bearing clearance for high-speed turbopump applications is approximately 0.0024 cm (0.0010 in). These close clearances present initial fabrication difficulties, as well as operational problems related to centrifugal and thermal differential growth, and dirt contamination over the entire range of operating speeds and temperatures.

For high pressure high speed turbopumps, the axial forces acting upon the rotating group become very large, requiring careful design of a thrust bearing to accommodate these large forces. As in the case of the journal bearings, ball bearing type thrust bearings are not practical due to the low temperatures and high speed.

It is thus apparent that there is a need for a turbopump which remains operational at cryogenic temperatures, and which features an efficient, reliable, and durable mounting and supporting configuration for the rotating group.

Art relevant to the present invention may be found in U.S. Pat. Nos. 4,795,274; 4,818,123; and 4,871,267; issued 3 Jan. 1989, 4 Apr. 1989, and 3 Oct. 1989, respectively, to Alston L. Gu; and in U.S. Pat. No. 4,624,583, issued 25 Nov. 1986 to Marshall P. Saville, and A. Gu.; all of which are assigned to the assignee of the present application.

The present invention details a cryogenic turbopump for pumping cryogenic liquid fuel which features a multistage pump attached to a turbine and supported on process fluid hydrodynamic foil journal bearings and hybrid hydrodynamic-hydrostatic thrust bearings. The turbopump includes a pair of hydrodynamic foil journal bearings positioned along a shaft interconnecting the turbine with the pumps. These foil bearings are provided with a flow of cooling process fluid which is scavenged from a high pressure location downstream of one of the pump stages and dumped to a lower pressure location. The hybrid hydrodynamic-hydrostatic thrust bearing is positioned intermediate the turbine and the pumps at an axial back-face surface of one of the pump rotors. The pump rotor cooperates with the pump housing to define an annular hydrostatic thrust-balance cavity. Received in the cavity is a hydrodynamic foil thrust bearing also having as its thrust reaction surface the axial back-face of the pump rotor. At low and intermediate speeds, the hydrodynamic foil thrust bearing reacts thrust forces from the pump rotating group. The rotor and housing cooperatively define fluid inlet and fluid outlet metering gaps communicating from pump discharge to the thrust balance cavity, and from the latter to pump inlet pressures, respectively. Thus, at intermediate and high speeds where the pump outlet pressure (and thrust forces) are highest, the hydrostatic bearing reacts an increasing part of, or all of, the thrust forces from the rotating assembly.

Figure 1:
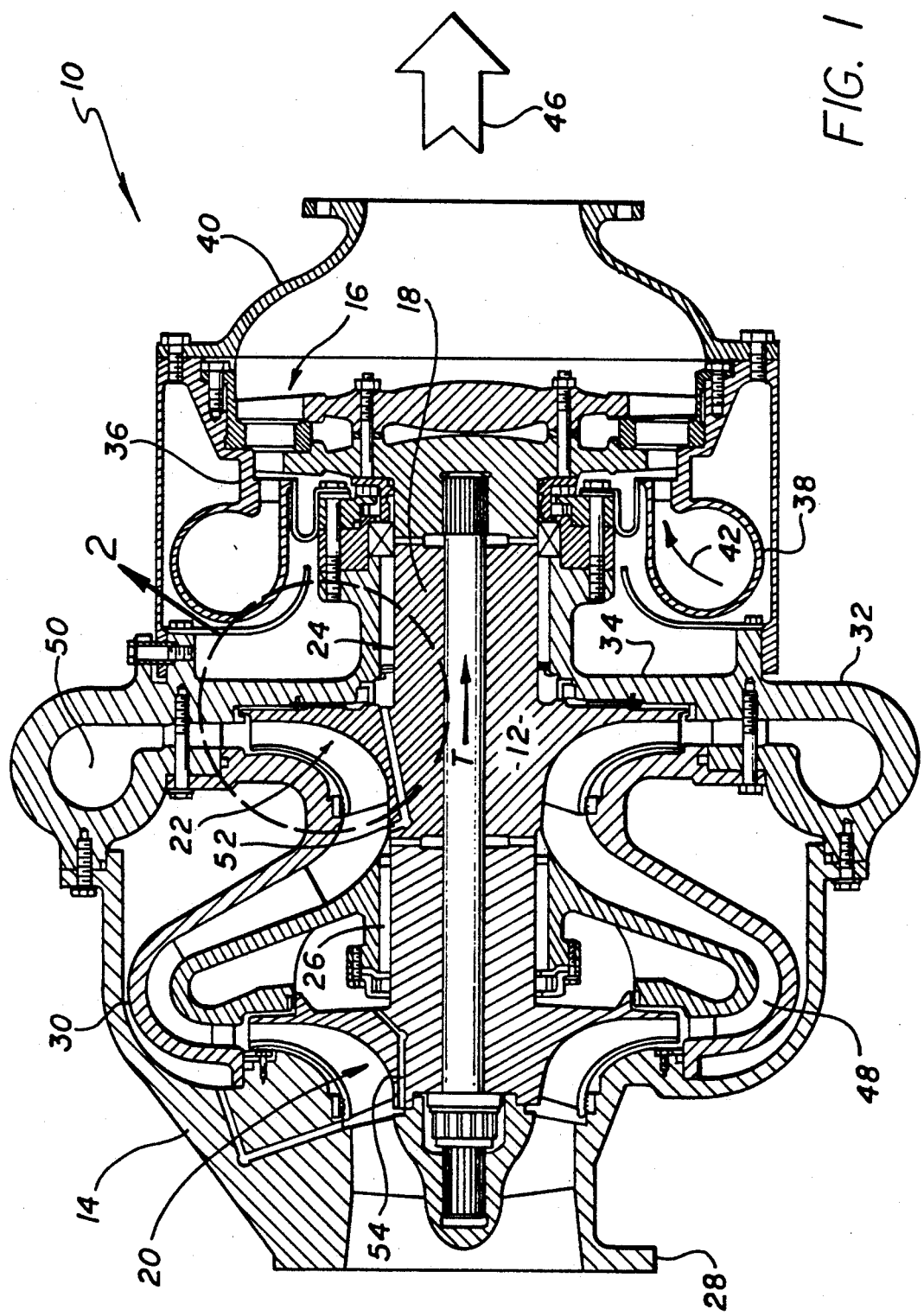
FIG. 1 depicts a longitudinal view, partially in cross section, of a compact cryogenic turbopump embodying the invention.

FIG. 1 shows a cross-sectional view of a high pressure cryogenic fluid turbopump 10 having a rotating group 12 contained within a housing assembly 14. The rotating group 12 includes turbine section 16, for extracting useful work from a flow of pressurized fluid, attached to a drive shaft 18 which extends axially through the center of the turbopump 10, and connected at an opposite end to a first stage pump 20. The rotating group 12 also includes a second stage pump 22, turbine-end journal bearing 24, as well as a pump-end journal bearing 26, all located between the turbine 16 and first stage pump 20. The housing assembly 14 is assembled from a number of elements including an inlet duct 28, first stage shroud duct 30, second stage shroud duct 32 including an annular thrust plate 34, turbine shroud assembly 36 including a turbine involute 38, and turbine outlet duct 40.

The turbopump 10 is driven by a flow of high pressure motive fluid which is received and distributed by turbine volute 38 so as to be directed uniformly upon turbine blades (as represented by arrow 42) of turbine 16. The turbine 16 extracts useful work from the flow of high pressure fluid in the form of rotational power delivered to shaft 18. This rotational power drives the rotating group 12, including first and second stage pumps 20, 22 to very high rotational speeds. The spent motive fluid flows from the turbopump 10 via the outlet duct 40, as is depicted by arrow 46. The first stage pump rotor 20 adds kinetic energy to the cryogenic fluid and delivers this fluid to a first stage diffuser and pressure-recovery passage 48 defined in shroud 30. The fluid is then directed upon second stage pump 22 wherein it is similarly accelerated and pressurized. Upon exiting the second stage pump 22, the fluid flows through outlet duct 50 defined in shroud 32.

Due to the motive and cryogenic fluid flows just described, the rotating group 12 spins at high speed. The foil journal bearings 24, 26, for example, may be in accord with the teachings of the U.S. Pat. Nos. '274 or '123 patents referenced earlier herein. The bearing 24 is provided at its right end with pressurized fluid from the discharge shroud 32 via a passage which is not illustrated, while the left end of bearing 24 is communicated to inlet pressure of second stage pump 22 via a passage 52. Similarly, the right end of bearing 26 is communicated to outlet pressure from first stage pump 20 (near the inlet to second stage pump 22) while the left end of this bearing is communicated to inlet pressure via a passage 54. Thus, a flow of cryogenic process fluid is assured through the foil journal bearings 24, 26.

As a result of the motive and pumped cryogenic fluid flows described above, the rotating group 12 is subject also to an axial thrust force, depicted on FIG. 1 with arrow T. According to the preferred embodiment of the invention, the thrust force T is always rightward, viewing FIG. 1. Consequently, from zero speed at start up, through intermediate speeds to design speed or above, and during spin-down back to zero speed, the rotating group 12 always tends to move rightwardly relative to housing 14.

Figure 2:
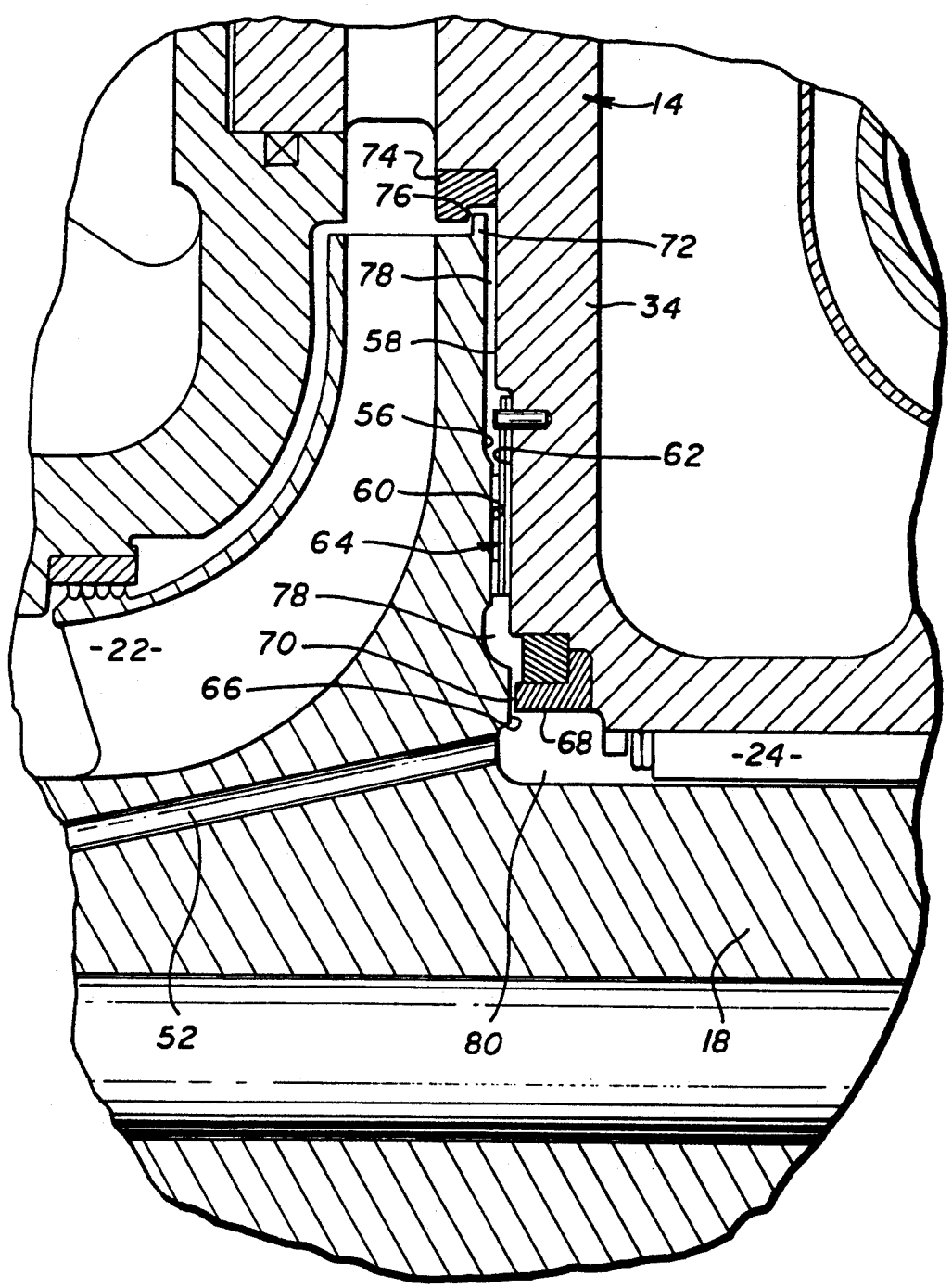
FIG. 2 is an enlargement of an encircled portion of FIG. 1.

Viewing now FIG. 2, it will be seen that the pump rotor 22 includes an axially-disposed annular back-face surface 56. The surface 56 axially confronts an axial surface 58 defined by thrust plate 34, and includes an axially protruding annular thrust runner surface 60. Opposite the thrust runner surface 60, the thrust plate 34 defines an axial recess 62 wherein is received a foil thrust bearing, referenced with numeral 64. The foil thrust bearing 64 may be provided, for example, in accord with the teachings of the U.S. Pat. Nos. '267, or '583 patents referenced hereinabove.

Importantly, the pump rotor 22 includes a radially inner annular protrusion 66 extending axially toward, but short of, an opposing annular protrusion 68 defined by the housing 14. That is, when the rotating group 12 is fully rightward with respect to housing 14, within the movement allowed by full compression contact of the foil thrust bearing 64, the protrusions 66 and 68 do not quite touch one another. Consequently, the protrusions 66 and 68 define an annular gap 70 decreasing, but not entirely closing, with rightward relative axial motion of rotating group 12.

Similarly, the pump rotor 22, at its radially outer periphery, defines a radially outwardly extending rim 72, an axial face of which axially confronts an annular shoulder 74 extending radially inwardly on housing 14. The rim 72 and shoulder 74 cooperate to define an axial gap 76 which opens in response to rightward relative movement of the rotating group 12 and housing 14.

Still viewing FIG. 2, it is seen that the pump rotor 22 and housing 14 cooperate to define an annular thrust reaction cavity 78. Gap 76 communicates high pressure fluid from the discharge of pump 22 into cavity 78. Similarly, gap 70 communicates cavity 78 with an annular chamber 80 at the left end of journal bearing 24. The chamber 80 communicates with the inlet of pump rotor 22 via passage 52.

In view of the above, it will be appreciated that a flow of cryogenic process fluid to foil thrust bearing 64 is assured. Also, as the speed of pump rotating group 12 increases through intermediate speeds to design speed, the pump outlet pressure, which appears at gap 76, increases greatly. This outlet pressure is communicated to cavity 78, more than counter-balancing the axial thrust force T, and moving rotating assembly 12 leftwardly. The leftward movement of assembly 12, both closes gap 76 and opens gap 70 so that these gaps serve to meter fluid into and from cavity 78. Because the gaps 76 and 70 are opposite in their metering action in response to axial relative movement of the rotating group 12, the latter reaches a stable equilibrium axial position in which the axial hydrostatic force of fluid pressure in cavity 78 plus the retained thrust force from bearing 64 matches the axial force T. When this force balance is achieved, the hydrodynamic foil thrust bearing 64 is partially relived of the necessity to react thrust forces. Almost the entire thrust force on rotating group 12 is reacted by hydrostatic pressure in cavity 78 acting on the back-face surface 56 of pump rotor 22.

The foil thrust bearing 64 always shares part of the total thrust load "T", due to its compliance and spring rate. That is, the leftward axial movement of the rotating group 12 as the hydrostatic thrust bearing at cavity 78 increasingly carries the thrust load is not such as to completely unload the thrust bearing 64. In summary, during start up and at low speeds, the foil bearing 64 carries the thrust load, but is never required to carry more than its design limit load because fluid pressures in the pump 10 are comparatively low. At high speeds when pump pressures are higher, the thrust load "T" is high but the hydrostatic thrust balance at cavity 78 takes most of the load.

Figure 3:
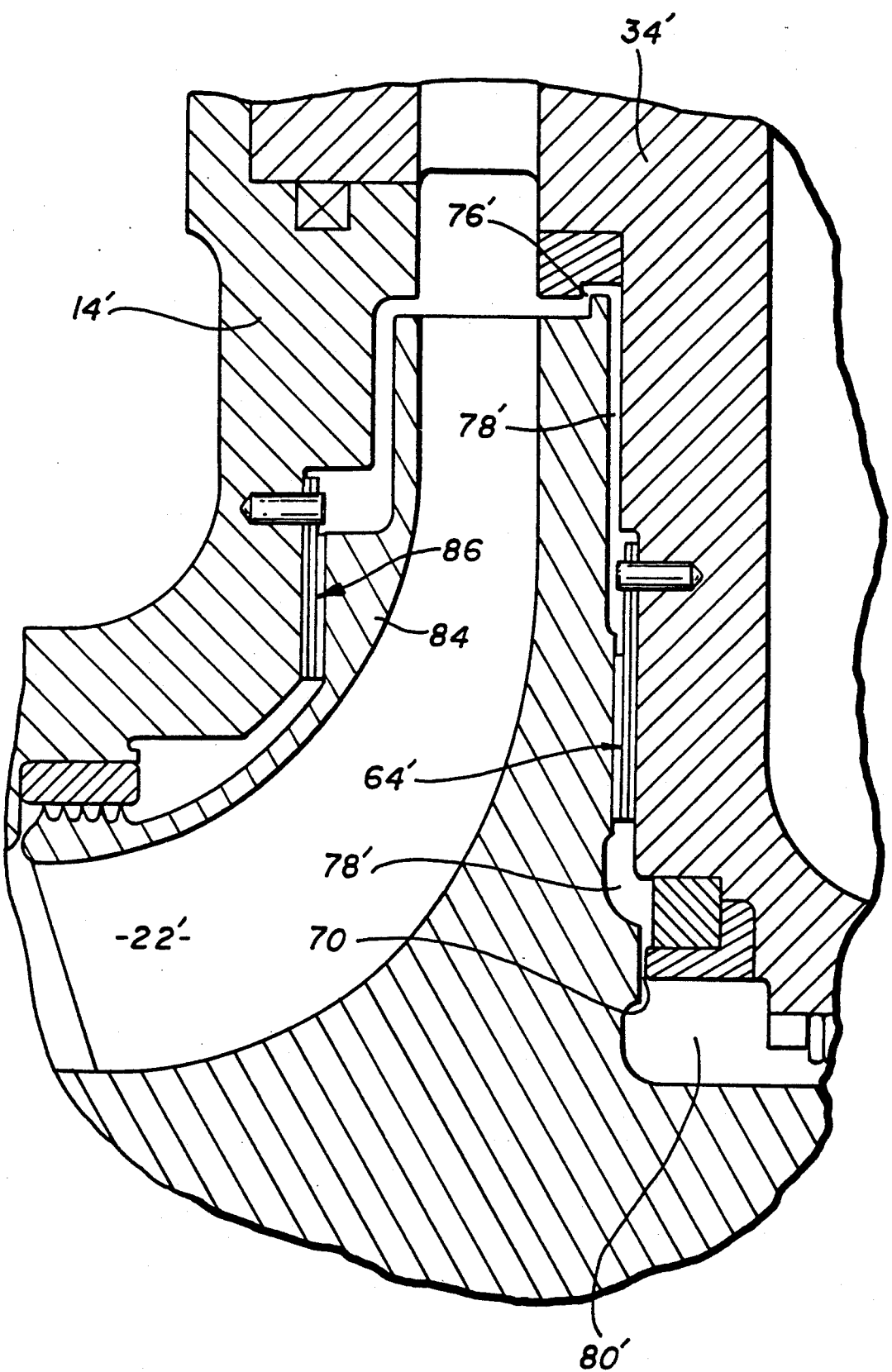
FIG. 3 is an enlarged fragmentary view similar to FIG. 2, but showing an alternative embodiment of the invention.

In the event that a particular design or operating condition of a turbopump results in the thrust forces at some time being toward the left, recalling FIG. 1, then the alternative embodiment of FIG. 3 may be employed. Like features are referenced in FIG. 3 with the same numeral used previously and having a prime added. FIG. 3 depicts a turbopump 10' in most respects like that depicted in FIGS. 1 and 2. However, an annular shroud portion 82 of the pump rotor 22' includes an axially disposed thrust shoulder 84. Confronting the thrust shoulder 84, the housing 14' carries an annular foil thrust bearing 86. In this case, the rotor 22 is axially captured between bearings 64' and 86, with sufficient axial sway space allowed for operation of the metering gaps 70', 76' as the rotating group 12 seeks and stabilizes in its equilibrium axial position.

We claim:

1. A turbopump having utility particularly for pumping cryogenic process fluid, said turbopump comprising: a housing defining a first flow path therethrough for communicating a flow of motive fluid and a second flow path therethrough for communicating a flow of said process fluid, said housing journaling a rotating assembly in said first and said second flow paths, said rotating assembly including a turbine section in said first flow path rotationally extracting mechanical shaft power from said motive fluid and a pump rotor in said second flow path receiving said shaft power to rotationally impel said process fluid, said housing and said pump rotor cooperatively bounding an annular thrust balance cavity as well as defining both a radially inner and a radially outer axial metering gaps each opening and closing oppositely in response to axial relative movement of said rotating assembly, one of said metering gaps communicating discharge process fluid while the other of said metering gaps communicates with inlet process fluid pressure, and a fluid dynamic foil thrust bearing disposed in said thrust balance cavity for cooperation with an annular thrust runner surface of said pump rotor, whereby said foil bearing hydrodynamically reacts rotating assembly thrust forces below a certain pump operating speed and pump discharge pressure and said rotating assembly dithers axially to meter process fluid into and from said cavity achieving an equilibrium of thrust forces to hydrostatic pressure force in said cavity at higher speeds and pressures, sharing said thrust forces with said foil bearing.

2. The invention of claim 1 wherein said pump rotor is of centrifugal type having an axial inlet communicating to a radial outlet and an axial back-face surface axially opposite said inlet, said back-face surface bounding said thrust balance cavity.

3. The invention of claim 2 wherein said radially inner metering gap is defined cooperatively by an axial portion of said back-face surface in axial congruence with an axially spaced feature of said housing.

4. The invention of claim 2 wherein said radially outer metering gap is defined cooperatively by a radially extending annular rim of said pump rotor, and a axially congruent annular shoulder axially confronting said rim.

5. The invention of claim 1 wherein said pump rotor defines therein an axial passage communicating to pump inlet fluid pressure the one of said metering gaps through which flows process fluid from said cavity.

6. The invention of claim 1 wherein said pump rotor defines an axial protrusion upon which is defined said annular thrust runner surface, said housing defining an axial recess opposite said thrust runner surface, and said foil thrust bearing being disposed in said recess.

7. The invention of claim 1 wherein said pump rotor further defines a second thrust runner surface disposed axially oppositely to said first-recited runner surface, a second foil thrust bearing carried by said housing in cooperation with said second thrust runner surface, and said foil thrust bearings axially capturing said pump rotor therebetween.

8. The method of reacting axial thrust loads in a turbopump having a turbine section driven by a flow of motive fluid and a pump section impelling a process fluid, said method including the steps of employing a hydrodynamic bearing to react said thrust loads from zero speed to a certain operating speed, employing a hydrostatic thrust balance to increasingly react said thrust loads from said certain speed to a design speed whereat said hydrodynamic bearing is partially unloaded, providing a pair of oppositely-acting metering gaps responsive to axial relative movement of a rotating assembly including said turbine and pump sections to respectively flow high pressure process fluid into and from a thrust balance cavity of said hydrostatic balance and which cavity is bounded in part by a pressure-responsive face of said rotating assembly, and disposing said hydrodynamic bearing in said thrust balance cavity intermediate said metering gaps for immersion in said flow of process fluid.

9. The method of claim 8 further including the steps of providing said pump section with a pump rotor having an axial back-face, and using said axial back-face both to 5 bound said thrust balance cavity as said pressure-responsive face of said rotating assembly and to define an annular thrust runner surface cooperable with said hydrodynamic bearing.

10. The method of claim 9 further including the step of using a foil-type bearing as said hydrodynamic bearing.

11. The method of claim 9 further including the steps of defining another opposite axially disposed thrust runner surface upon said pump rotor, employing a second hydrodynamic thrust bearing in cooperation with said another thrust runner surface, and axially capturing said pump rotor between said thrust bearings.

12. The method of claim 11 further including the step of providing a preselected axial sway space for said rotating assembly between said thrust bearings to permit operation of said axial metering gaps.

13. A cryogenic turbopump comprising:
a housing having a pair of separate flow paths therein each extending between a respective inlet and outlet, the first flow path communicating a flow of motive fluid while the second communicates a flow of cryogenic process fluid;
a rotating assembly journaled by said housing in both said separate flow paths, said rotating assembly having a turbine section in said first flow path extracting shaft power therefrom, a rotational shaft portion and a pump rotor portion driven by said shaft portion in said second flow path to impel said cryogenic process fluid;
a hydrodynamic foil journal bearing carried by said housing and journaling said shaft, said housing and shaft section cooperatively providing a flow channel for cryogenic process fluid from a high pressure source to a lower pressure receiver via said foil journal bearing;
said pump rotor portion and said housing cooperatively defining an annular thrust reaction cavity bounded by a pressure-responsive axial surface of said pump rotor portion, said pump rotor portion and said housing further cooperatively defining a pair of oppositely acting axial metering gaps communicating a flow of cryogenic process fluid from a high pressure source to a lower pressure receiver via said thrust reaction cavity, said metering gaps opening and closing in opposition in response to relative axial movement of said rotating assembly;
and a hydrodynamic foil thrust bearing disposed between said housing and a thrust runner surface of said pump rotor within said thrust reaction cavity for immersion in said flow of cryogenic process fluid.

14. The cryogenic turbopump of claim 13 wherein said pump rotor portion is of centrifugal flow type having an axially disposed inlet leading to axially and radially outwardly extending channels and a radially outwardly disposed outlet, an axial back-face surface of said pump rotor portion defining said pressure-responsive surface and bounding said thrust reaction cavity.

15. The cryogenic turbopump of claim 14 wherein said pump rotor portion adjacent its radially outer periphery and outlet defines a radially outwardly extending rim, said housing defining a radially inwardly extending shoulder spaced from and in axial congruence with said rim so that axially extending surfaces of said rim and said shoulder cooperatively define a metering gap communicating said pump outlet with said thrust reaction cavity.

16. The invention of claim 15 wherein said rim and shoulder cooperatively trap said pump rotor in axial captivity between said shoulder and said thrust bearing.

* * * * *